United States Patent
Oertli (10) Patent No.: US 9,294,283 B2
(45) Date of Patent: Mar. 22, 2016

(54) METHODS AND DEVICES FOR MONITORING THE INTEGRITY OF AN ARTICLE DURING TRANSPORTING SAID ARTICLE

(75) Inventor: Christian Oertli, Oberhelfenschwil (CH)

(73) Assignee: Q-TAG AG, Ganterschwil (CH)

( * ) Notice: Subject to any disclaimer, the term of this patent is extended or adjusted under 35 U.S.C. 154(b) by 519 days.

(21) Appl. No.: 13/595,535

(22) Filed: Aug. 27, 2012

(65) Prior Publication Data

US 2013/0080784 A1    Mar. 28, 2013

Related U.S. Application Data (60) Provisional application No. 61/529,421, filed on Aug. 31, 2011.

(51) Int. Cl.
*H04L 9/32* (2006.01)
*G06Q 10/08* (2012.01)
(Continued)

(52) U.S. Cl.
CPC .............. *H04L 9/3247* (2013.01); *G06F 21/64* (2013.01); *G06Q 10/08* (2013.01); *G06F 21/55* (2013.01);
(Continued)

(58) Field of Classification Search
CPC ... H04L 9/32; H04L 9/3247; H04L 29/08558; H04L 67/12; H04L 2209/80; H04L 2209/805; H04L 9/3236; H04L 9/3263; G06Q 10/08; G06F 21/55; G06F 21/64; G06F 21/56; G06F 21/566
USPC .................................................. 713/175, 176
See application file for complete search history.

(56) References Cited

U.S. PATENT DOCUMENTS 7,124,170 B1 * 10/2006 Sibert .................... G06F 12/145
709/216
7,170,409 B2 * 1/2007 Ehrensvard .......... G08B 13/126
340/539.13

(Continued)

FOREIGN PATENT DOCUMENTS

| WO | 2004/099744 A2 | 11/2004 |
| WO | 2005/024586 A2 | 3/2005 |
| WO | 2005/047836 A2 | 5/2005 |

OTHER PUBLICATIONS

Van Oorschot et al., "Chapter 13: Key Management Techniques", Handbook of Applied Cryptography, CRC Press, 1996, pp. 543-590, Boca Raton, FL, USA.

*Primary Examiner* — Jayesh Jhaveri
(74) *Attorney, Agent, or Firm* — Rankin, Hill & Clark LLP (57) ABSTRACT

The method for obtaining information relating to the integrity of an article (2) as assessed from an exposure of said article (2) to physical or environmental conditions during a time span during which said article (2) is transported comprises
a) providing a device (1) to be located in proximity to said article (2) during said transport, digital certificate data (C) and first digital private key data (K1*) being stored in said device (1);
d) storing in said device (1) data (I) related to said physical or environmental conditions, said data being referred to as integrity data (I);
e) creating within said device (1) first digitally signed data (DS1) by digitally signing data comprising said integrity data (I) and said digital certificate data (C), using said first digital private key data (K1*);
f) storing said first digitally signed data (DS1) in said device (1).
A high degree of security against malpractice and data falsification can be achieved. A corresponding device (1) is also presented.

22 Claims, 6 Drawing Sheets

(51) Int. Cl.
  *G06F 21/64* (2013.01)
  *G06F 21/56* (2013.01)
  *H04L 29/08* (2006.01)
  *G06F 21/55* (2013.01)

(52) U.S. Cl.
  CPC .............. *G06F 21/56* (2013.01); *G06F 21/566* (2013.01); *G06F 2221/2135* (2013.01); *H04L 9/32* (2013.01); *H04L 9/3236* (2013.01); *H04L 9/3263* (2013.01); *H04L 67/12* (2013.01)

(56) References Cited

U.S. PATENT DOCUMENTS

| | | |
|---|---|---|
| 7,787,037 B2 | 8/2010 | Ono et al. |
| 2002/0186145 A1 | 12/2002 | Chainer et al. |
| 2004/0073808 A1* | 4/2004 | Smith ................ G06F 21/31 |
| | | 726/24 |
| 2005/0055237 A1 | 3/2005 | Schmidtberg et al. |
| 2005/0055287 A1 | 3/2005 | Schmidtberg et al. |
| 2005/0157774 A1 | 7/2005 | DiLuiso et al. |
| 2005/0206520 A1 | 9/2005 | Decker et al. |
| 2006/0250235 A1* | 11/2006 | Astrin .................. 340/539.22 |
| 2008/0016361 A1* | 1/2008 | Ginter ................ G06F 21/6209 |
| | | 713/176 |
| 2008/0252459 A1* | 10/2008 | Butler et al. .............. 340/572.1 |
| 2009/0033510 A1* | 2/2009 | Izumi et al. ............... 340/679 |
| 2009/0322510 A1* | 12/2009 | Berger ................ H04W 60/00 |
| | | 340/539.1 |
| 2011/0004513 A1* | 1/2011 | Hoffberg ................. 705/14.1 |
| 2011/0066398 A1* | 3/2011 | Troxler et al. ............. 702/150 |
| 2011/173409 A1* | 7/2011 | Sibert .................... 711/163 |
| 2011/0291803 A1* | 12/2011 | Bajic et al. ............... 340/10.1 |
| 2013/0311791 A1* | 11/2013 | Falk .................... G06F 21/55 |
| | | 713/194 |

* cited by examiner

METHODS AND DEVICES FOR MONITORING THE INTEGRITY OF AN ARTICLE DURING TRANSPORTING SAID ARTICLE

BACKGROUND OF THE INVENTION

1. Field of the Invention

The invention relates to methods and devices for monitoring the exposure of an article to physical or environmental conditions during a transport of the article. More particularly, the invention relates to ways of estimating the integrity of a transported article as assessed from the exposure of the article to physical or environmental conditions during the transport. The invention relates to methods and apparatuses according to the opening clauses of the claims. Such devices find application, e.g., when sensitive or delicate goods are transported, such as pharmaceutical products or foods or other fragile goods.

2. Description of Related Art

When sensitive or delicate goods such as pharmaceutical products or foods or fragile goods are transported, it can be desirable to monitor their exposure to specific hazards such as particularly high or low temperatures, particularly high or low humidity (water-content of ambient air), or particularly strong impacts (hits, blows), so as to be able to estimate the integrity of the transported goods.

Tags for accomplishing such tasks are known in the art. E.g., from US 2005/0157774 A1, a temperature monitor suitable for such purposes is known.

In conjunction with similar tags, it is suggested in U.S. Pat. No. 7,487,037 B2 to provide a method of evaluating the pedigree and/or integrity of a package transported from a source location to a destination location comprising the steps of receiving information from an electronic device associated with the package, such as a tag, at an authentication appliance at the destination location, transmitting at least a first portion of the information from the authentication appliance to a server, receiving from the server a network address of an authentication computer to be used to evaluate the pedigree and/or integrity of the package, after receiving the network address from the server, transmitting at least a second portion of the information from the authentication appliance to the authentication computer at the network address, and with the authentication computer, comparing at least the second portion of the information with data stored in a database to make a determination concerning the pedigree and/or integrity of the package.

In other words, having arrived at a destination location, data are retrieved from the tag associated with the package, sent to a (remote) computer and evaluated there, so as to determine the pedigree and/or integrity of the package.

It can be desirable to make the monitoring of transported packages more secure.

BRIEF SUMMARY OF THE INVENTION

Therefore, one object of the invention is to create ways of making the monitoring of transported packages more secure. More particularly, improved or more secure possibilities shall be created for obtaining information relating to the integrity of an article as assessed from an exposure of said article to physical or environmental conditions during a time span during which said article is transported. In particular, methods for obtaining information relating to the integrity of an article as assessed from an exposure of said article to physical or environmental conditions during a time span during which said article is transported shall be provided, and corresponding devices shall be provided, too.

Another object of the invention is to provide ways for making the monitoring of packages and/or the obtaining of information relating to the integrity of a transported article more secure.

Another object of the invention is to provide ways for preventing or reducing malpractice in conjunction with monitoring of packages and/or in conjunction with the obtaining of information relating to the integrity of a transported article.

Another object of the invention is to provide ways for reducing possibilities to falsify data stored in a tag and in a device, respectively, for obtaining information relating to the integrity of an article as assessed from an exposure of said article to physical or environmental conditions during a time span during which said article is transported.

Another object of the invention is to provide a tag for the before-specified purpose that is particularly easy to handle, and to provide a corresponding method.

Another object of the invention is to provide a tag for the before-specified purpose that meets particularly high security standards, and to provide a corresponding method.

Another object of the invention is to provide a tag for the before-specified purpose that poses particularly low requirements for revealing information relating to or describing the integrity of the package, and to provide a corresponding method.

Another object of the invention is to provide a tag for the before-specified purpose that is to a large extent usable without involving additional devices, and to provide a corresponding method.

Another object of the invention is to provide a tag for the before-specified purpose that has particularly low requirements with respect to internal data storage space, and to provide a corresponding method.

Another object of the invention is to provide a tag for the before-specified purpose that provides a particularly high protection of data accumulated in the tag against falsification or malpractice, and to provide a corresponding method.

Further objects emerge from the description and embodiments below.

At least one of these objects is at least partially achieved by apparatuses and methods according to the patent claims.

The method is a method for obtaining information relating to the integrity of an article as assessed from an exposure of said article to physical or environmental conditions during a time span during which said article is transported and comprises the steps of a) providing a device to be located in proximity to said article during said transport, digital certificate data and first digital private key data being stored in said device;

d) storing in said device data related to said physical or environmental conditions, said data being referred to as integrity data;

e) creating within said device first digitally signed data by digitally signing data comprising said integrity data and said digital certificate data, using said first digital private key data;

f) storing said first digitally signed data in said device.

This way, a very high degree of security against malpractice and data falsification can be achieved. Said integrity data can be digitally verified, and thus, it can be ensured that the integrity data are correct. Furthermore, being digitally signed, the integrity data themselves are still directly accessible (without further data conversion or particular processing), but, in addition, it can be checked whether or not the data are corrupted.

Usually, said article is transported in or as a package, wherein the term "package" as used in the present patent application generically refers to any article or combination of articles and/or objects that can be transported from one location to another. It may, e.g., refer to a single article (i.e., the lowest level of packaging such as a single bottle or a single vial) or to a carton containing one or more articles, or to a box containing one or more cartons, or to a pallet on which one or more boxes are arranged, or to a shipping container containing one or more pallets or boxes or cartons, or to a transport vehicle such as a train, a ship, a truck or an airplane carrying one or more pallets or shipping containers. Typically, the device is attached to a package comprising said article.

In one embodiment, the method comprises the step of
b) storing digital certificate data in said device.
In one embodiment which may be combined with the before-addressed embodiment, the method comprises the step of
c) storing first digital private key data in said device.

In one embodiment which may be combined with one or more of the before-addressed embodiments, said device is a tag, in particular a tag attachable to a package as which or in which said article is transported. This is a typical way of realizing said device.

In one embodiment which may be combined with one or more of the before-addressed embodiments, in step e), said first digitally signed data are created by digitally signing said integrity data together with said digital certificate data, using said first digital private key data. In many cases, said integrity data are materially the most important data, and the digital certificate data are of particular importance for ensuring the data security (preventing data falsification or manipulation). Thus, data storage space and processing time and electrical energy can be saved when confining to these data in said digital signing process.

Usually, said physical or environmental conditions mentioned in step d) are such conditions to which said article is exposed during said time span. Typically, step d) is carried out in and by the device itself.
Typically, step e) is carried out in and by the device itself.
Typically, step f) is carried out in and by the device itself.

In one embodiment which may be combined with one or more of the before-addressed embodiments, said integrity data are text-representing data. This way, the use of the device is largely simplified. E.g., said integrity data can be displayed without the need of a specific software which would firstly convert the data into text-representing data before displaying them, as it would have to be the case for most (proprietary) binary data. With the integrity data being data to be presented in a human-readable form, dealing with the integrity data is simple.

In one embodiment, which may be combined with one or more of the before-addressed embodiments, said device comprises a display for displaying at least a portion of said integrity data; and in particular, the method comprises the step of displaying at least a portion of said integrity data by means of said display of said device. Such embodiments are particularly well suited for combination with the before-addressed embodiment (integrity data being text-representing data).

In one embodiment which may be combined with one or more of the before-addressed embodiments, said device comprises at least one sensor for sensing said physical or environmental conditions, and said method comprises the step of g) by means of said sensor, creating data representative of said physical or environmental conditions at various times during said time span, a data set comprising said data being referred to as environmental data;

wherein said integrity data are identical with or different from said environmental data. This way, the device itself is capable of sensing/monitoring said physical or environmental conditions. Usually, said data representative of said physical or environmental conditions are created in regular time intervals. But it is also possible to provide that they are created in irregular time intervals.

In one embodiment referring to the before-addressed embodiment, said data representative of said physical or environmental conditions are created on the average in time intervals of at least 5 seconds and at most 30 minutes, rather of at least 20 seconds and at most 10 minutes, typically of at least 30 seconds and at most 5 minutes.

In one embodiment referring to one or both of the two last-addressed embodiments, said integrity data are different from said environmental data, and said method comprises the step of
h) obtaining said integrity data from said environmental data.

Accordingly, some kind of processing is carried out in order to obtain said integrity data from said environmental data, and this is typically carried out within said device. This reduces the amount of processing that has to be carried out outside of said device and it also renders superfluous specific devices or items in addition to said device for carrying out that processing.

In one embodiment referring to the before-addressed embodiment, step h) comprises the step of
h1) obtaining data referred to as integrity raw data by processing said environmental data.

Usually, said integrity raw data are different from said integrity data, the first typically being binary data, the latter typically being text-representing data.
Step h1) is typically carried out within said device.

Usually, said processing mentioned in step h1) is carried out at various times during said time span. More particularly, said processing mentioned in step h1) may be carried out when step g) is carried out, in particular said processing mentioned in step h1) may be carried out in reaction to each creation of said environmental data.

In one embodiment referring to the before-addressed embodiment, the processing mentioned in step h1) comprises an integration of at least a portion of said environmental data. This can result in a reduction of the amount of data that have to be stored in said device, and it in addition makes it possible (cf. the next embodiment) to present—already during said time span—whether or not the article has been exposed to unsuitable conditions or not.

In one embodiment referring to one or both of the two last-addressed embodiments, step h1) is carried out during said time span. In particular, said processing mentioned in step h1) is carried out at various times during said time span.

In one embodiment which may be combined with one or more of the before-addressed embodiments comprising step h1), the processing mentioned in step h1) is carried out in dependence of predescribed limitations for the exposure of said article to said physical or environmental conditions. Thus, it is possible to determine whether said physical or environmental conditions to which said article was exposed fall within acceptable parameters for these conditions specific for the article while the article was being transported, i.e. during said time span. This way, an early (preliminary) result (describing the article's current integrity) can be obtained.

In one embodiment which may be combined with one or more of the before-addressed embodiments comprising step h), step h) comprises the step of h2) obtaining said integrity data from said integrity raw data.

This step is usually carried out within said device.

In one embodiment referring to the before-addressed embodiment, step h2) comprises converting data, in particular said integrity raw data, into text-representing data.

In one embodiment which may be combined with one or more of the before-addressed embodiments, the method comprises the step of i) receiving in said device an indication that an end of said time span is reached.

Such an indication may, e.g., originate from a user (e.g., a person receiving the article at a destination location) operating a user control of said device, e.g., pressing a button of the device, or said user interrupting an electrical circuit of said device, or said indication is an indication that a pre-programmed end-time is reached.

In one embodiment referring to the before-addressed embodiment in combination with at least one embodiment comprising step h1), step h2) is carried out in reaction to said receiving of said indication. I.e. after termination of the time span, the integrity data are generated. The so-obtained integrity data can be considered "final" integrity data, since usually, the article's exposure to said physical or environmental conditions is monitored only until said end of said time span. Thus, these integrity data may comprise all relevant data concerning the article's exposure to said physical or environmental conditions. It is possible to carry out step h2) not before receiving said indication.

In one embodiment which may be combined with one or more of the before-addressed embodiments, the method comprises the step of j) obtaining said integrity data in dependence of predescribed limitations for the exposure of said article to said physical or environmental conditions.

Accordingly, said integrity data are data which depend on said predescribed limitations. With said integrity data being dependent on said environmental data, the said integrity data are data dependent on said predescribed limitations and on said environmental data.

Usually, said predescribed limitations are stored in said device, in particular in a non-volatile memory of said device, such as in a flash memory.

Usually, step j) is carried out within said device.

In one embodiment which may be combined with one or more of the before-addressed embodiments, step e) comprises the steps of e1) creating first hash data by applying a first hash function to data comprising said integrity data and said digital certificate data;

e2) creating first signature data by encrypting said first hash data by means of said first digital private key data; and e3) obtaining said first digitally signed data by joining said data comprising said integrity data and said digital certificate data with said first signature data.

In one embodiment which may be combined with one or more of the before-addressed embodiments, the method comprises the step of k) reading said first digitally signed data out of said device.

This allows one to look at or analyze these data in an external appliance. Step k) can be accomplished, e.g., using a Universal Serial Bus (USB) interface of said device or in a wireless fashion, e.g., using radio frequency electromagnetic waves.

In one embodiment which may be combined with one or more of the before-addressed embodiments, the method comprises the step of l) reading said first digitally signed data into an appliance different from said device.

In one embodiment referring to the before-addressed embodiment, the method comprises the step of m) by means of said appliance, presenting said integrity data comprised in said first digitally signed data.

In one embodiment which may be combined with one or more of the before-addressed embodiments, the method comprises the step of p) digitally verifying said integrity data comprised in said first digitally signed data using first digital public key data, said first digital public key data being associated with said first digital private key data.

This allows one to ensure that said integrity data comprised in said first digitally signed data are not manipulated or corrupted. E.g., the article owner may carry out step p).

Usually, step p) is carried out externally to said device, e.g., in an appliance such as the above-mentioned appliance (cf. step l)).

It is possible to provide, in particular as an additional security measure, that step p) is carried out after a successful verification of said first content data and of said digital certificate data, respectively. In that case, referring to a step n) described below, step p) is carried out after step n) has been carried out and if a result of the digital verification mentioned in step n) is positive.

In one embodiment which may be combined with one or more of the before-addressed embodiments comprising steps e1) to e3) as well as step p), step p) comprises the steps of p1) applying said first hash function to said data comprising said integrity data and said digital certificate data;

p2) decrypting said first signature data using said first digital public key data;

p3) comparing the data obtained in step p1) with the data obtained in step p2).

If the verification result is positive (cf. step p)), i.e. if the data compared in step p3) are equal, it may be assumed that said integrity data comprised in said first digitally signed data are correct and unmodified and may therefore be trusted. But if the verification result is negative (cf. step p)), i.e. if the data compared in step p3) are not equal, it must be assumed that said integrity data comprised in said first digitally signed data have been modified and should therefore not be trusted.

The combination of the two verification steps n) (cf. below) and p) allows one to achieve a particularly high security with respect to the trustability of said integrity data comprised in said first digitally signed data.

In one embodiment which may be combined with one or more of the before-addressed embodiments comprising step p), the method comprises at least one of the steps of u1) loading said first digital public key data from the internet;

u2) receiving said first digital public key data via e-mail;

u3) providing said first digital public key data on a storage device, in particular on a mobile storage device such as a memory stick or a compact disc (CD).

If step p) is carried out in an external device external to said device (tag), e.g., in the appliance mentioned in step l), said digital public key data are, in case of step u1), loaded into that external device, e.g., into the appliance mentioned in step l);

in case of step u2), received in that external device;

in case of step u3), loaded from said (mobile) storage device into said external device.

E.g., said appliance may be used for displaying at least a portion of said integrity data.

In one embodiment which may be combined with one or more of the before-addressed embodiments, said digital certificate data comprise second digitally signed data created by digitally signing first content data using second digital private key data.

In one embodiment which may be combined with one or more of the before-addressed embodiments, the method comprises the step of creating said digital certificate data, said creating said digital certificate data comprising creating second digitally signed data by digitally signing first content data using second digital private key data.

In one embodiment referring to one or both of the two last-addressed embodiments, said digitally signing data comprising first content data comprises the steps of x1) creating second hash data by applying a second hash function to data comprising said first content data;
x2) creating second signature data by encrypting said second hash data by means of said second digital private key data; and
x3) obtaining said second digitally signed data by joining said data comprising said first content data with said second signature data.

Said second hash function can be equal to or different from said first hash function (cf. steps e1) and p1) above).

Typically, said data to which said second hash function is applied (first content data; cf. step x1)) comprise first identification data. Usually, said first identification data are text-representing data. And usually, said first identification data are data identifying a person or entity associated with said device, in particular a person or entity producing and/or selling and/or supplying and/or distributing said device. It can be provided that said first identification data are data identifying a person or an entity producing said certificate data.

In one embodiment which may be combined with one or more of the before-addressed embodiments involving said second digitally signed data, the method comprises the step of n) digitally verifying said first content data comprised in said first digitally signed data using second digital public key data, said second digital public key data being associated with said second digital private key data.

This allows one to ensure that said first digitally signed data and thus said digital certificate data are not manipulated or corrupted. E.g., the article owner may carry out step n).

Usually, step n) is carried out externally to said device, e.g., in an appliance such as the before-mentioned appliance (cf. step l).

In one embodiment which may be combined with one or more of the before-addressed embodiments comprising steps x1) to x3) as well as step n), step n) comprises the steps of n1) applying said second hash function to said first content data;
n2) decrypting said second signature data using said second digital public key data;
n3) comparing the data obtained in step n1) with the data obtained in step n2).

If the verification result (cf. step n)) is positive, i.e. if the data compared in step n3) are equal, it may be assumed that said first content data comprised in said first digitally signed data are correct and unmodified and may therefore be trusted. But if the verification result is negative (cf. step n)), i.e. if the data compared in step n3) are not equal, it must be assumed that said first content data comprised in said first digitally signed data, and, accordingly, the digital certificate data, have been modified, and thus also the integrity data should not be trusted.

In one embodiment which may be combined with one or more of the before-addressed embodiments comprising step n), the method comprises at least one of the steps of v1) loading said second digital public key data from the internet;
v2) receiving said second digital public key data via e-mail;
v3) providing said second digital public key data on a storage device, in particular on a mobile storage device such as a memory stick or a compact disc (CD);
v4) providing that said second digital public key data are comprised in a software usable for carrying out step n) and/or step p).

These are practical ways not only of obtaining said second digital public key data, but also of providing some security that said second digital public key data are correct and not illegally modified.

In one embodiment which may be combined with one or more of the before-addressed embodiments comprising step p) and involving said first content data, said first content data comprise said first digital public key data. This makes it possible to ensure that the first digital public key data comprised in said digital certificate data are not manipulated. And said first digital public key data comprised in said first digitally signed data can be verified in step n), using said second digital public key data. If then, the verification result obtained in step n) is positive (i.e. if the data compared in the respective step n3) are equal), it may be assumed that said first digital public key data comprised in said first digitally signed data are correct and unmodified and may therefore be trusted. But if the verification result is negative in that step n) (i.e. if the data compared in the respective step n3) are not equal), it must be assumed that said first digital public key data comprised in said first digitally signed data have been modified and should therefore not be trusted. And, it can be advantageous to carry out step p) after a successful verification of said first digital public key data, in other words, step p) can be carried out after the respective step n) has been carried out and if a result of the corresponding digital verification is positive.

In one embodiment which may be combined with one or more of the before-addressed embodiments, said physical or environmental conditions comprise a temperature, in particular an ambient temperature. This is useful in case of articles which are particularly temperature sensitive, which may mean that a certain minimum temperature may not be fallen short of, or a certain maximum temperature may not be exceeded, or both. Therein, it will usually be assumed that—typically after some time for equilibration—the temperature measured by means of said device is (at least substantially) the same as the temperature of said article.

In one embodiment which may be combined with one or more of the before-addressed embodiments, said physical or environmental conditions comprise at least one of
  a temperature, in particular an ambient temperature;
  a humidity, in particular an ambient humidity;
  an acceleration.

Determining said acceleration can be useful if said article is mechanically particularly sensitive. It may comprise, e.g., detecting mechanical shocks to which said article is possibly exerted.

Determining said humidity can be useful in case of articles that are particularly sensitive to humidity, which may mean that a certain minimum amount of humidity is required, or that a certain maximum humidity may not be exceeded, or both. This may be accomplished by detecting (in any known way) the amount of water (as contained in ambient air to which said article or a package containing said article is exposed) to which said article is exposed.

In one embodiment which may be combined with one or more of the before-addressed embodiments, the method comprises transporting said article from a source location to a destination location.

In a first aspect, the device for obtaining information relating to the integrity of an article as assessed from an exposure of said article to physical or environmental conditions during a time span during which said article is transported, said device comprises a storage unit in which digital certificate data; and first digital private key data;

are stored.

Such a device may allow one to provide a high degree of security against malpractice and data falsification.

In one embodiment, said device is a tag. This is a particularly practical way of realizing such a device.

In one embodiment referring to the before-addressed embodiment, said device is a device to be located in proximity to said article during said transport.

In one embodiment which may be combined with one or more of the before-addressed embodiments, said digital certificate data comprise second digitally signed data created by digitally signing data comprising first content data using second digital private key data.

In one embodiment referring to the before-addressed embodiment, said first content data comprise first identification data, in particular wherein these first identification data are text-representing data, more particularly text-representing data identifying a person or entity associated with said device, in particular the device supplier. It can be provided that said first identification data are data identifying a person or an entity producing said certificate data.

In one embodiment which may be combined with one or more of the before-addressed device embodiments, said device comprises at least one sensor for sensing said physical or environmental conditions.

In one embodiment which may be combined with one or more of the before-addressed device embodiments, said device comprises a display for displaying data, more particularly a display for displaying data in human-readable form. In particular, said display is a display for displaying at least a portion of integrity data, wherein said integrity data are data related to said physical or environmental conditions.

In one embodiment which may be combined with one or more of the before-addressed device embodiments, said device comprises an interface for transmitting digital data to an appliance different from said device. The data transmission of an external appliance may be accomplished in a wireless fashion or in a wire-bound fashion.

In one embodiment which may be combined with one or more of the before-addressed device embodiments, said device comprises a control unit structured and configured for digitally signing data. Said control unit may comprise or be circuitry. It may be or comprise a microprocessor. A suitably programmed microprocessor can be used for accomplishing said digital signing of data.

In one embodiment which may be combined with one or more of the before-addressed device embodiments, in said storage unit, predescribed limitations for the exposure of said article to said physical or environmental conditions are stored.

In one embodiment which may be combined with one or more of the before-addressed device embodiments, said device comprises or is a probeless monitor for monitoring said physical or environmental conditions.

The invention comprises devices according to said first aspect with features of corresponding methods according to the invention, and vice versa also methods with features of corresponding devices according to said first aspect.

In a second aspect, the device for obtaining information relating to the integrity of an article as assessed from an exposure of said article to physical or environmental conditions during a time span during which said article is transported, said device comprises a control unit structured and configured for digitally signing data.

Such a device is prepared to provide a high degree of security against malpractice and data falsification.

The invention comprises devices according to said second aspect with features of corresponding devices according to said first aspect, and vice versa also devices according to said first aspect with features of corresponding devices according to said second aspect. E.g., also the device according to said second aspect can be a tag; and a microprocessor may be used for implementing said control unit; and so on.

In one embodiment which may be combined with one or more of the before-addressed device embodiments in which the device comprises said control unit, said control unit is structured and configured for carrying out said digital signing of data in reaction to receiving an indication that an end of said time span is reached.

In one embodiment which may be combined with one or more of the before-addressed device embodiments in which the device comprises said control unit, said control unit is structured and configured for storing within said device, data obtained by said digital signing of data. In particular, wherein said device comprises a storage unit comprising a non-volatile memory, and wherein said data obtained by said digital signing of data are stored in said non-volatile memory.

In one embodiment which may be combined with one or more of the before-addressed device embodiments in which the device comprises said control unit, said device comprises at least one sensor for sensing said physical or environmental conditions, said sensor being structured and configured for creating data representative of said physical or environmental conditions at various times during said time span, a data set comprising said data being referred to as environmental data, said control unit being structured and configured for obtaining integrity data from said environmental data, wherein said integrity data are text-representing data related to said physical or environmental conditions, and wherein said integrity data are different from said environmental data. In particular, wherein said physical or environmental conditions are physical or environmental conditions to which said article is exposed during said time span.

In one embodiment referring to the before-addressed embodiment, said control unit is structured and configured for digitally signing data comprising said integrity data.

In one embodiment referring to the before-addressed embodiment, digital certificate data and first digital private key data are stored in said device, and wherein said control unit is structured and configured for digitally signing data comprising said integrity data and said digital certificate data using said first digital private key data.

In one embodiment, which may be combined with one or more of the before-addressed device embodiments in which the device comprises said control unit and said at least one sensor, said control unit is structured and configured for obtaining integrity data from said environmental data in dependence of predescribed limitations for the exposure of said article to said physical or environmental conditions.

In one embodiment which may be combined with one or more of the before-addressed device embodiments in which the device comprises said control unit, said control unit is structured and configured for applying at least one hash function to data.

The invention comprises devices according to said second aspect with features of corresponding methods according to the invention, and vice versa also methods with features of corresponding devices according to said second aspect.

In a more general view of the invention, the digital certificate data may be dispensed with. In other words, in the more general method, in step a), the digital certificate data need not be stored in the device, and in step e), the digitally signed data need not comprise the digital certificate data. And correspondingly, in the device according to the before-specified first aspect, the digital certificate data need not be comprised in said storage unit.

The advantages of the methods basically correspond to the advantages of corresponding devices and vice versa.

Further embodiments and advantages emerge from the dependent claims and the figures.

BRIEF DESCRIPTION OF THE DRAWINGS

Below, the invention is described in more detail by means of examples and the included drawings. The figures show schematically.

The reference symbols used in the figures and their meaning are summarized in the list of reference symbols. The described embodiments are meant as examples and shall not confine the invention.

DETAILED DESCRIPTION OF THE INVENTION

Figure 1:
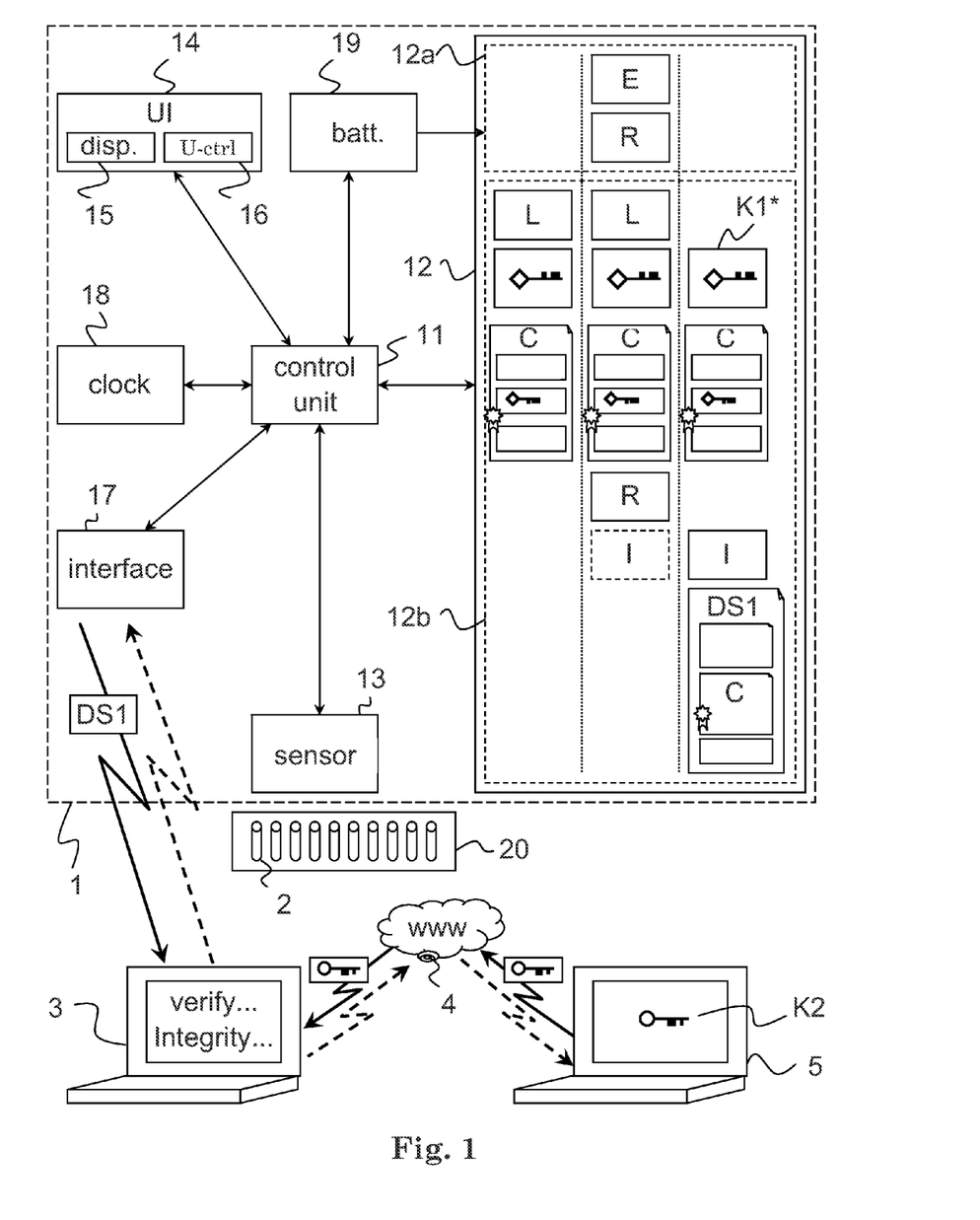
FIG. 1 a block-diagrammatical illustration of a device and its use.

FIG. 1 shows a schematized block-diagrammatical illustration of a device 1 and its use. The device 1 is meant to monitor a physical or environmental property such as a temperature or a humidity to which an article 2 is exposed during a certain time span, wherein the article is subject to being transported within said time span. Article 2 can be contained in a package 20 comprising several articles. Device 1 can be a tag attached to package 20, e.g., the package 20 can be a pallet, and device 1 is a tag attached to the top of the pallet; or package 20 is a carton, and device 1 is glued to that carton.

Device 1 comprises a sensor 13 for monitoring said environmental property, e.g., sensor 13 is or comprises a temperature sensor or a humidity sensor. Device 1 furthermore comprises a storage unit 12 for storing data, in particular digital data, a control unit 11, an energy supply 19 such as a battery, a clock generator 18, an interface 17 and a user interface 14.

All the items or units shown within the square labelled 1 are usually contained in a housing of device 1. Thus, device 1 may prevailingly function independently of other devices and in different environments. With respect to said sensor 13, the magnitude sensed by sensor 13 usually is sensed within said housing, while it is assumed that the article 2 is exposed to the same conditions as those present in said housing, at least after some time for equilibration.

Storage unit 12 may comprise, as shown in FIG. 1, a volatile memory 12a such as RAM and non-volatile memory 12b such as flash RAM.

Energy supply 19 not only feeds electrical energy to control unit 11 and storage unit 12 (more particularly volatile memory 12a), but also to other constituents of device 1 (this is not explicitly shown in FIG. 1).

User interface 14 typically comprises one or more user controls 16 such as buttons or switches and a display such as a liquid crystal display (LCD). The latter allows a user of device 1 to perceive information provided by device 1, e.g., a current value sensed by sensor 13 or information whether or not article 2 has already been exposed to unsuitable conditions, and user control 16 allows the user to provide input to device 1, more particularly to control unit 11, e.g., for starting said time span (typically when the transport of the article begins, at a source location) and/or for indicating that said time span is finished (typically when the transport of the article has ended, at a destination location). It is also possible to provide that input such as input provided by the user may be received (in device 1) in a wireless fashion by means of user interface 14.

Interface 17 allows transfer of data from device 1 to an external device such as an appliance 3, e.g., a personal computer.

Clock 18 enables device 1 to measure time and may provide control unit 11 with clock information.

Control unit 11 may be, e.g., a suitably programmed microprocessor.

An important aspect of the invention is related to the prevention of data manipulation; it shall be ensured that one can rely on data concerning the integrity of article 2 outputted by device 1.

Another aspect of the invention relates to the possibility to provide some data analysis already during said time span, which on the one hand can save memory space and on the other hand can make possible to provide or perceive important results already during said time span.

According to the latter point, device 1 is—in the embodiment shown in FIG. 1—not a logger. A logger merely stores all the data points (measured temperatures and the like) until the end of said time span. Evaluations or data analysis would take place only or practically only after the end of said time span. But here, it is rather suggested that device 1 continually determines whether or not said physical or environmental conditions to which article 2 (or more precisely device 1) is exposed are outside of allowed ranges for article 2. This can be accomplished each time that sensor 13 provides another sensing result, or in larger time intervals during said time span. This can be inferred also in from illustration of storage unit 12 in FIG. 1.

In FIG. 1, two parallel dotted lines separate three states or three points in time. In the left-most state, it is illustrated, which data are typically stored in storage unit 12 before said time span begins, i.e. in an initial state of said device. 1. In the middle, it is illustrated, which data are typically stored in storage unit 12 during said time span, i.e. typically during transport of said article 2 (and of said device 1). In the right-most state, it is illustrated, which data are typically stored in storage unit 12 when said time span ends or after the end of the time span, i.e. in a final state of said device 1.

In the middle, i.e. during said time span, it is illustrated that environmental data E are stored in volatile memory 12a. These are basically the data provided by sensor 13. In addition, integrity raw data R are stored in volatile memory 12a in this middle-most state. These data R are derived from data E by some processing, such as comparing of data, time integration, calculating moving averages or the like or a combination thereof.

From data R, it can be inferred whether or not limitations specified for said article have been fully met (so far), or whether such limitations have been violated. Data E and data R are usually binary data, which reduces the required memory space and makes processing simple.

The processing during said time span can make it possible to judge whether or not the article is still in order or has lost its integrity already during said time span (i.e. typically during the transport). E.g., corresponding information may be steadily displayed in display 15 or upon request, e.g., upon operation of user control 16.

In order to be able to accomplish said processing yielding data R, limitation data L are provided already before the start of said time span. Data L may comprise, e.g., one or more threshold values for said physical or environmental conditions sensed by sensor 13 and possibly also time durations during which certain threshold values may or may not remain traversed. Accordingly, data L may well be considered data representative of predescribed limitations for said article 2.

The processing applied to data E in order to derive data R may comprise, e.g., determining if an upper threshold value for a sensed condition, e.g., for the ambient temperature, is exceeded by the environmental data E determined by sensor 13 for at least a predetermined minimum duration, or if the environmental data E determined by sensor 13 fall below a lower threshold value for a sensed condition for at least a predetermined minimum duration.

During said time span, data E, R and L are stored in storage unit 12, wherein it can be provided that only the recent-most environmental data E are stored there at any time while deleting older data E. It can be useful to occasionally, e.g., periodically, e.g., between every one hour and every 5 days or so, store data R in non-volatile memory 12b, so as to minimize the danger of data loss.

Possibly already during said time span (dashed rectangle in FIG. 1) or rather when an indication of an end of said time span has been received in device 1 (or more precisely in control unit 11), integrity data I are derived from data R. Note that in case that it is not provided that data R are obtained during said time span, it is possible to derive data I from data E (instead of from data R). Integrity data I are text-representing data, the text being indicative of the integrity of article 2, as assessed from the conditions sensed by sensor 13. When data I are displayed or otherwise presented (e.g., acoustically), a person can therefrom immediately infer whether article 2 is assumed to be in order or must be assumed to have undergone some damage during said time span. In the latter case, it can also be provided that integrity data I also indicate which undesired conditions (as judged from data L) article 2 had been exposed to, and possibly also the time interval during which such an undue exposure has taken place.

In order to be available and readable, respectively, for a long time, data I are stored in non-volatile memory 12b, and since the information contained in data I is very important, it is desirable to make sure that data I are correct and not manipulated or otherwise untrue or corrupted.

This brings us to the data security aspect. But before, it shall be mentioned that of course, some of the data indicated in FIG. 1 as being comprised in storage unit 12 in some state (at some time) may be dispensed with in that state (at that time), and some may in addition be comprised in there elsewhere. And furthermore, it is possible to distribute the data shown in FIG. 1 differently between said volatile memory 12a and non-volatile memory 12b, and it is possible to provide only one type of memory (volatile or non-volatile). It is furthermore to be noted that, in principle, one can dispense with the certificate data C, but at the cost of a reduced security. The consequences thereof are readily deduced from the description and figures described above or below.

In device 1, a security aspect based on digital signatures and digitally signing documents, respectively, is implemented. By means of such techniques, it can be ensured (with a high level of secureness) that a certain document (or certain data) were indeed produced by a certain person or party. This works by encrypting data, using a private key only available to said person or party, and subsequently decrypting, using a corresponding public key accessible to the public (or at least to the person or party to receive said document).

For implementing such a technology in a particularly secure way in device 1, before the beginning of said time span, not only data L are provided in storage unit 12, but also a first private key, more precisely first digital private key data K1*, and (optionally) in addition a digital certificate C. Certificate C is digitally signed data which are more closely described in conjunction with FIGS. 2 and 3. Data K1* and C are typically used not before the end of said time span.

Figure 2:
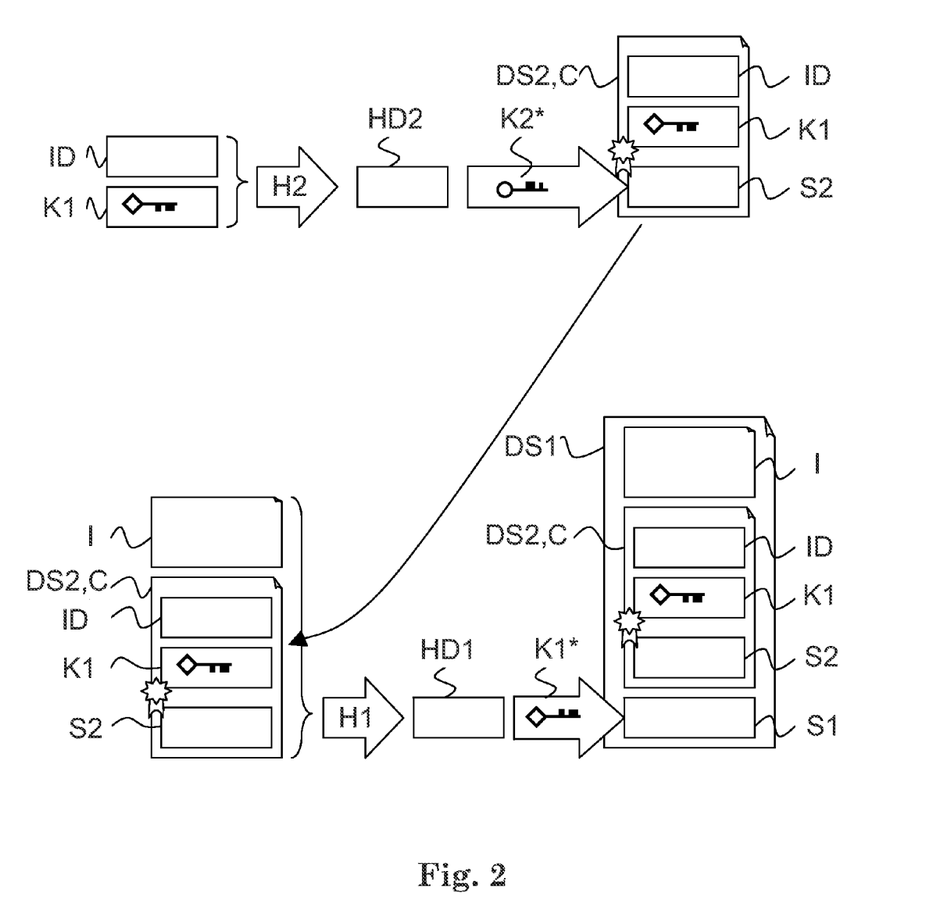
FIG. 2 a block-diagrammatical illustration of digital signing processes.

FIG. 2 is a schematized block-diagrammatical illustration of digital signing processes. The upper portion of FIG. 2 illustrates the generating of certificate data C, which may be accomplished outside device 1, e.g., in a computer. The lower portion of FIG. 1 illustrates the generating of digitally signed data DS1, wherein this step usually takes place within device 1 using microprocessor 11.

Certificate data C can also be considered digitally signed data or (second) digitally signed data DS2. The data digitally signed in digitally signed data C comprise first digital public key data K1 and also identification data ID which usually identify the company or entity providing device 1. In order to generate first digital signature data S1, a hash function H2 is applied to the content data (data K1 plus data ID), so as to obtain hash data HD2, and then, data HD2 are encrypted using second digital private key data K2*. Data C comprises data ID, data K1 and data S2. Data C shall make attempts to falsify data DS1 more difficult and may allow to verify (cf. FIG. 3) that the identification data ID and in particular the public key data K1 contained therein are not corrupted or falsified.

When said time span has expired, first digitally signed data DS1 are generated. The data digitally signed in digitally signed data DS1 comprises integrity data I and certificate data C. To these data, a first hash function H1 is applied, yielding hash data HD1. Data HD1 are then encrypted using digital private key data K1*, thus yielding digital signature data S1. Digital private key data K1* are the private key data corresponding to digital public key data K1.

Data DS1 thus comprise data I, data C and data S1. It is possible to provide that the integrity data I comprised in digitally signed data DS1 can be read and displayed by means of most standard computers or computing devices including smart phones or other computer-like appliances. E.g., integrity data I may be provided in a pdf file, pdf being the widely-used portable document format. Being text-representing data, integrity data are readily presentable, usually without a need of software specific to device 1. If data I were binary data, a specific software would usually be required for obtaining human-representable or human-understandable contents therefrom.

And in addition, data I are two-fold protected against manipulation, once by means of encryption using digital private key data K1* and once by means of digital private key data K2*, the latter being used for protecting certificate data C and thus digital public key data K1 and identification data ID from manipulation. This may become clearer in conjunction with FIG. 3.

Figure 3:
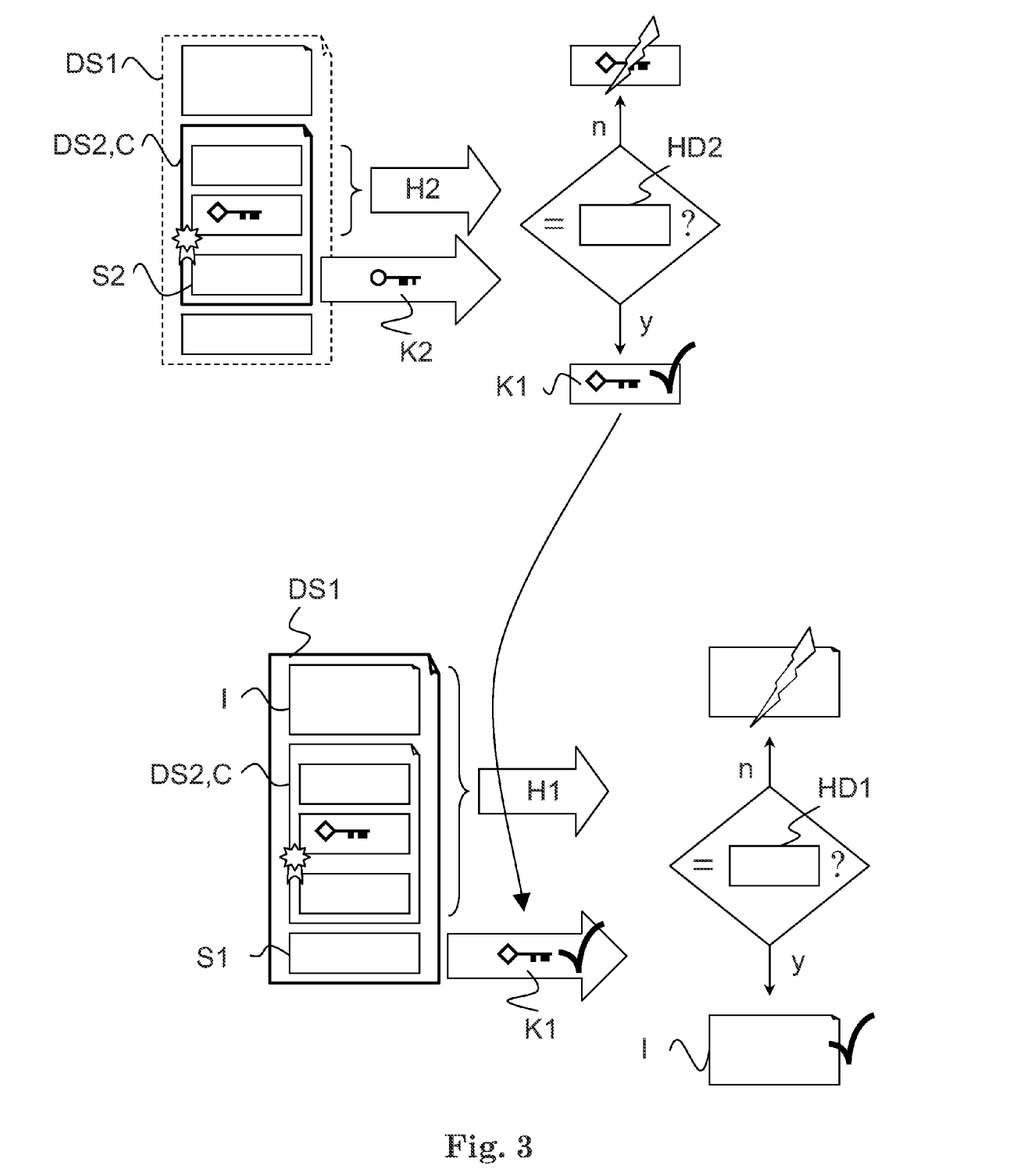
FIG. 3 a block-diagrammatical illustration of digital verification processes.

FIG. 3 is a schematized block-diagrammatical illustration of digital verification processes. The verification processes are usually carried out by means of an external appliance like appliance 3 shown in FIG. 1. Data DS1 are transmitted, e.g., wirelessly, to appliance 3 in order to carry out the verification steps therein. In appliance 3, digital public key data K2 may be stored, e.g., comprised in a software stored in appliance 3 for carrying out one or both of the verification processes illustrated in FIG. 3; or digital public key data K2 may be transferred from elsewhere into appliance 3. E.g., digital public key data K2 are received, by means of appliance 3, via the internet 4 from a computer or server 5, e.g., operated by or for a provider of device 1. Digital private key data K2* are the private key data corresponding to digital public key data K2.

The upper portion of FIG. 3 illustrates the digital verification of certificate data C or, more particularly, of the content data (digital public key data K1 and identification data ID) comprised therein. For accomplishing the verification, the before-mentioned hash function H2 is applied to the data digitally signed in data C, namely to data comprising data K1 and data ID (content data). And digital signature data S2 are decrypted using digital public key data K2. If the two so-obtained hash data are equal (namely data HD2), it is ensured that the content data as contained in data DS1 are not corrupted and may be trusted.

Figure 4:
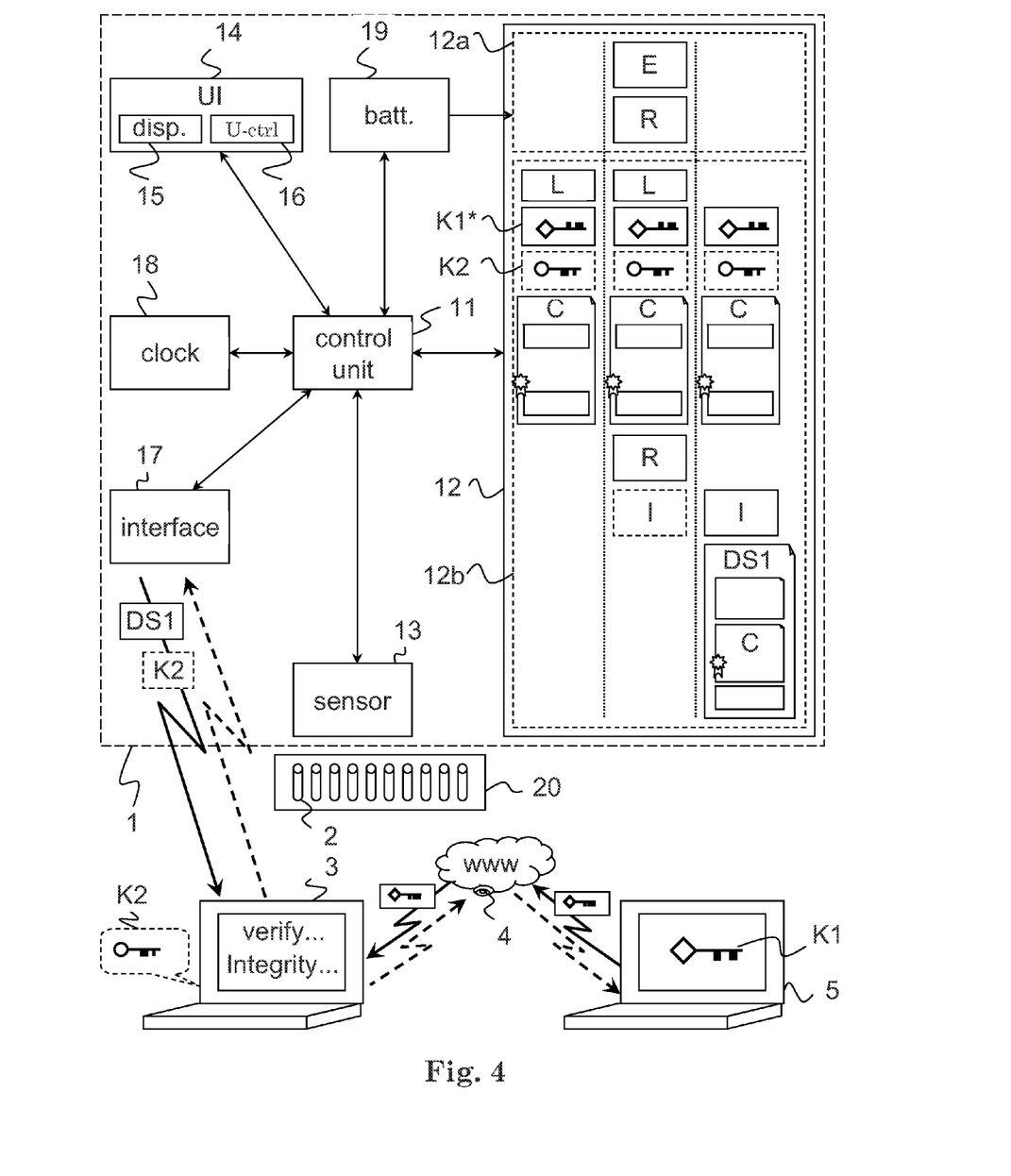
FIG. 4 a block-diagrammatical illustration of a device and its use.
Figure 5:
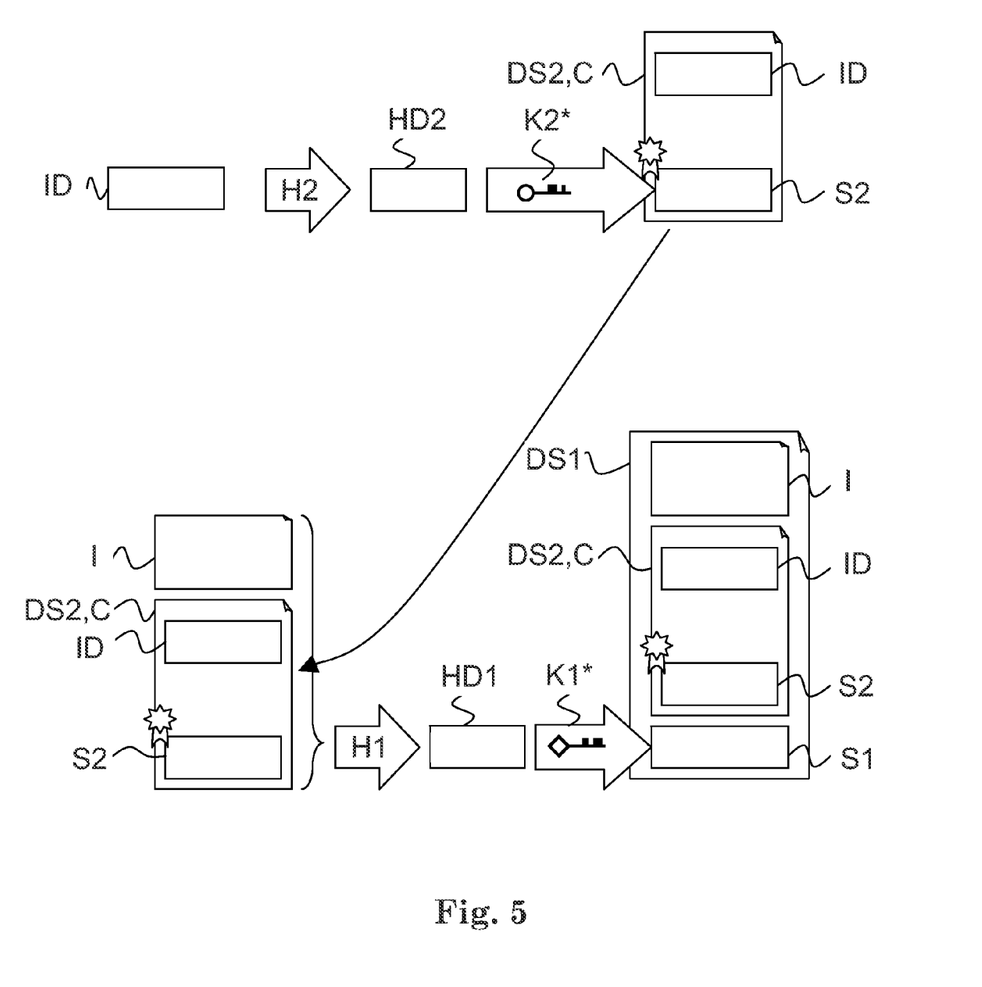
FIG. 5 a block-diagrammatical illustration of digital signing processes.

The lower portion of FIG. 3 illustrates the digital verification of integrity data I. Therein, data K1 are required. Data K1 can be taken from data C as contained in data DS1 either without verification or after verification as explained above (cf. upper portion of FIG. 3). The latter, of course, provides a higher level of security. Alternatively, data K1 may be obtained otherwise, cf., e.g., FIG. 4 and the description thereof (see below).

In order to verify integrity data I as contained in data DS1, the before-mentioned hash function H1 is applied to the data digitally signed in data DS1, namely to data comprising data I and data C. And digital signature data S1 are decrypted using digital public key data K1. If the two so-obtained hash data are equal (namely data HD1), it is ensured that integrity data I as contained in data DS1 are not corrupted and may be trusted.

By means of the above-described verifications, an authentication can be achieved. It can be verified that data such as data K1 and data I were indeed created by the device provider and by device 1, respectively.

FIGS. 4 to 7 illustrate, in the same way as FIGS. 1 to 3 (FIGS. 6 and 7 corresponding to the upper and the lower portion, respectively, of FIG. 3), another embodiment which is similar to the embodiment illustrated in FIGS. 1 to 3, but differs therefrom in some points concerning digital public key data K2 and digital public key data K1 and thus also certificate data C.

Accordingly, in the following discussion of this other embodiment, all the features the two embodiments have in common are generally neglected (cf. the description of FIGS. 1 to 3 for that), and the differences are highlighted. But it is noted that various differences between the embodiments are readily extracted from the Figures.

In this other embodiment of FIGS. 4 to 7, it is illustrated that data K1 may be loaded from the internet 4, e.g., from server 5 typically associated with the tag provider. But it is also possible to receive data K1, in appliance 3, by e-mail or by means of a (mobile) storage device such as a memory stick or a compact disc (CD). In these cases, data K1 need not be (but may be, though) comprised in device 1, more particularly in certificate data C.

Figure 6:
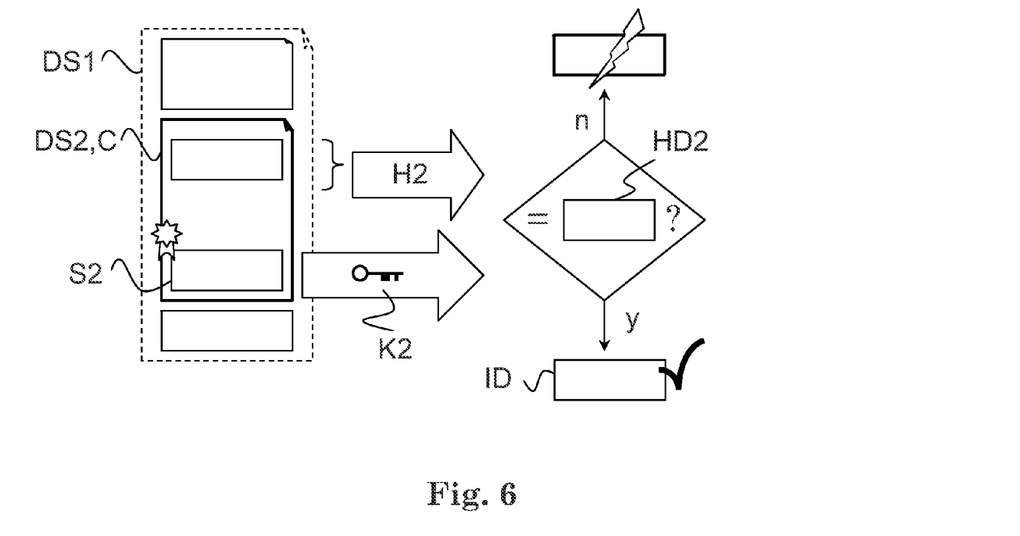
FIG. 6 a block-diagrammatical illustration of a digital verification process.
Figure 7:
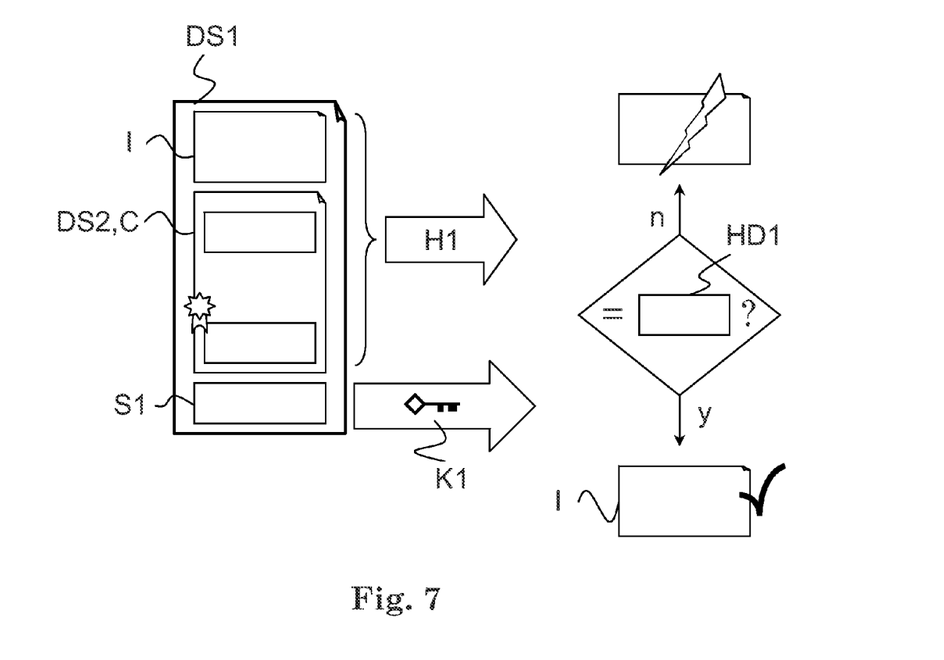
FIG. 7 a block-diagrammatical illustration of a digital verification process.

Furthermore, in this other embodiment illustrated in FIGS. 4 to 7, digital public key data K2 need not be (but may be, though) loaded from the internet 4 (cf. FIG. 1). Instead, data K2 may be stored in appliance 3 (cf. FIG. 4), e.g., as a portion of a software used for carrying out the verification step illustrated in FIG. 6 (and possibly also for carrying out the verification step illustrated in FIG. 7). Or, alternatively or additionally, data K2 may be stored in device 1 (cf. FIG. 4). It is also possible to receive data K2 in appliance 3 by e-mail, e.g., by an e-mail from the tag provider. The verification illustrated in FIG. 6 is optional, but may contribute to additional security.

As will have become clear from the above, a device 1 of the following kind may be provided: A device 1 which is capable of automatically accumulating data about physical or environmental conditions to which the device, and therefore also an article 2 located in proximity to the device 1, is exposed during a transport of the article 2 from a source location to a destination location, wherein at least optionally already during the transport, automatic data processing is applied to the environmental data E, wherein this processing is accomplished in dependence of data L descriptive of limitations specific to said article concerning said physical or environmental conditions. After the transport (typically at the destination location), within device 1, the (optionally processed) data are processed so as to obtain text-representing data I indicating information concerning the integrity of the article 2 (as assessed from the exposure of device 1 and article 2, respectively, to said conditions), and at least these simple-to-handle and simple-to-read data I are digitally signed in order to make sure that they are not manipulated or falsified. A digital public key (data K1) may be provided in device 1, in particular within certificate data C, the latter also being digitally signed data. A high level of security against data manipulation can be achieved while maintaining a simple access to important information allowing to judge whether or not the article 2 is still in order or has lost its integrity.

LIST OF REFERENCE SYMBOLS 1 device, tag
2 article
3 appliance, external device
4 internet
5 server, server of tag provider
11 control unit
12 storage unit
12a volatile memory, RAM
12b non-volatile memory, flash RAM
13 sensor
14 user interface
15 display
16 user controls
17 interface, data interface, communication interface
18 clock generator
19 energy supply, battery
20 package
C certificate data
DS1,DS2 digitally signed data
E environmental data
I integrity data
ID identification data
H1,H2 hash functions
HD1,HD2 hash data K1,K2 digital public key data, public keys
K1*,K2* digital private key data, private keys
L limitation data
R integrity raw data
S1,S2 digital signature data, digital signature

The invention claimed is:

1. A method for obtaining information relating to an integrity of an article as assessed from an exposure of said article to physical or environmental conditions during a time span during which said article is transported, said method comprising the steps of:
   a) providing a device to be located in proximity to said article during said transport, digital certificate data and first digital private key data being stored in said device;
   d) storing in said device data related to said physical or environmental conditions, said data being referred to as integrity data;
   e) creating within said device first digitally signed data by digitally signing data comprising said integrity data and said digital certificate data, using said first digital private key data, by:
      e1) creating first hash data by applying a first hash function to data comprising said integrity data and said digital certificate data;
      e2) creating first signature data by encrypting said first hash data by means of said first digital private key data; and
      e3) obtaining said first digitally signed data by joining said data comprising said integrity data and said digital certificate data with said first signature data;
   f) storing said first digitally signed data in said device;
   g) by means of at least one sensor, creating data representative of said physical or environmental conditions at various times during said time span, and a data set comprising said data being referred to as environmental data;
   h) obtaining said integrity data from said environmental data, by:
      h1) obtaining data referred to as integrity raw data by processing said environmental data; and
      h2) obtaining said integrity data from said integrity raw data;
   i) receiving in said device an indication that an end of said time span is reached, wherein the step h2) is carried out in reaction to said receiving of said indication;
   j) obtaining said integrity data in dependence of predescribed limitations for the exposure of said article to said physical or environmental conditions; and
   p) digitally verifying said integrity data comprised in said first digitally signed data using first digital public key data, said first digital public key data being associated with said first digital private key data.

2. The method according to claim 1, wherein said integrity data is text-representing data.

3. The method according to claim 1, wherein said integrity data is identical with or different from said environmental data.

4. The method according to claim 1, wherein the step h1) is carried out during said time span.

5. The method according to claim 1, wherein the processing mentioned in the step h1) is carried out in dependence of predescribed limitations for the exposure of said article to said physical or environmental conditions.

6. The method according to claim 1, wherein said digital certificate data comprises second digitally signed data created by digitally signing first content data using second digital private key data.

7. The method according to claim 6, wherein said digitally signing said first content data comprises the steps of:
   x1) creating second hash data by applying a second hash function to said first content data;
   x2) creating second signature data by encrypting said second hash data by means of said second digital private key data; and
   x3) obtaining said second digitally signed data by joining said first content data with said second signature data.

8. The method according to claim 6, further comprising the step of:
   n) digitally verifying said first content data comprised in said first digitally signed data using second digital public key data, said second digital public key data being associated with said second digital private key data.

9. The method according to claim 6, wherein said first content data comprises first digital public key data, said first digital public key data being associated with said first digital private key data.

10. The method according to claim 7, further comprising the step of:
    n) digitally verifying said first content data comprised in said first digitally signed data using second digital public key data, said second digital public key data being associated with said second digital private key data;
    wherein the step n) comprises the steps of:
    n1) obtaining further hash data by applying said second hash function to said first content data;
    n2) obtaining decrypted data by decrypting said second signature data using said second digital public key data; and
    n3) comparing said further hash data with said decrypted data.

11. The method according to claim 1, wherein said physical or environmental conditions comprise a temperature.

12. The method according to claim 1, wherein said digital certificate data is digitally signed data.

13. A device for obtaining information relating to an integrity of an article as assessed from an exposure of said article to physical or environmental conditions during a time span during which said article is transported, said device comprising a programmed microprocessor, and a storage unit in which
    digital certificate data
    first digital private key data; and
    first digitally signed data
    are stored, wherein said first digitally signed data is obtained by digitally signing data comprising integrity data and said digital certificate data, using said first digital private key data, wherein said integrity data is data related to said physical or environmental conditions, the storage unit structured and configured to store a set of instructions, which when executed by the programmed microprocessor, causes the device to perform:
    creating within said device said first digitally signed data by digitally signing data comprising said integrity data and said digital certificate data, using said first digital private key data, by:
    creating first hash data by applying a first hash function to data comprising
    said integrity data and said digital certificate data;
    creating first signature data by encrypting said first hash data by means of said first digital private key data;
    obtaining said first digitally signed data by joining said data comprising said integrity data and said digital certificate data with said first signature data;

receiving, from at least one sensor, data representative of said physical or environmental conditions at various times during said time span, and a data set comprising said data being referred to as environmental data;

obtaining said integrity data from said environmental data, by:
  obtaining data referred to as integrity raw data by processing said environmental data;
  obtaining said integrity data from said integrity raw data;

receiving in said device an indication that an end of said time span is reached, wherein the obtaining said integrity data from said integrity raw data is carried out in reaction to said receiving of said indication; and obtaining said integrity data in dependence of predescribed limitations for the exposure of said article to said physical or environmental conditions.

14. The device according to claim 13, wherein said digital certificate data comprises second digitally signed data created by digitally signing data comprising first digital public key data using second digital private key data, said first digital public key data being associated with said first digital private key data.

15. The device according to claim 13, wherein said device comprises the at least one sensor for sensing said physical or environmental conditions.

16. The device according to claim 13, wherein said device comprises a control unit structured and configured for digitally signing data.

17. The device according to claim 13, wherein in said storage unit, predescribed limitations for the exposure of said article to said physical or environmental conditions are stored.

18. The device according to claim 13, wherein said digital certificate data is digitally signed data.

19. A device for obtaining information relating to an integrity of an article as assessed from an exposure of said article to physical or environmental conditions during a time span during which said article is transported, said device comprising:

a control unit structured and configured for:
  digitally signing data comprising integrity data and digital certificate data using first digital private key data, wherein said integrity data is data related to said physical or environmental conditions;
  creating within said device first digitally signed data by digitally signing data comprising said integrity data and said digital certificate data, using said first digital private key data, by:
    creating first hash data by applying a first hash function to data comprising said integrity data and said digital certificate data;
    creating first signature data by encrypting said first hash data by means of said first digital private key data;
    obtaining said first digitally signed data by joining said data comprising said integrity data and said digital certificate data with said first signature data;
  storing said first digitally signed data in said device;

a storage unit configured for storing the digital certificate data and the first digital private key data, wherein the device is located in proximity to said article during said transport; and at least one sensor for sensing said physical or environmental conditions configured to create data representative of said physical or environmental conditions at various times during said time span, and a data set comprising said data being referred to as environmental data, wherein said control unit is further structured and configured for:
  obtaining said integrity data from said environmental data, by:
    obtaining data referred to as integrity raw data by processing said environmental data; and
    obtaining said integrity data from said integrity raw data;
  receiving in said device an indication that an end of said time span is reached, wherein the obtaining said integrity data from said integrity raw data is carried out in reaction to said receiving of said indication; and
  obtaining said integrity data in dependence of predescribed limitations for the exposure of said article to said physical or environmental conditions.

20. The device according to claim 19, wherein said control unit is structured and configured for carrying out said digitally signing of data in reaction to receiving said indication that the end of said time span is reached.

21. The device according to claim 19, wherein said integrity data is text-representing data related to said physical or environmental conditions, and wherein said integrity data is different from said environmental data.

22. The device according to claim 19, wherein said digital certificate data is digitally signed data.

* * * * *